June 29, 1965 J. W. CAMPBELL 3,192,120
NUCLEAR REACTOR CORE CONSTRUCTION
Filed March 29, 1961 2 Sheets-Sheet 1

INVENTOR.
John W. Campbell
BY
ATTORNEY

June 29, 1965   J. W. CAMPBELL   3,192,120
NUCLEAR REACTOR CORE CONSTRUCTION
Filed March 29, 1961   2 Sheets-Sheet 2

INVENTOR.
John W. Campbell
BY
ATTORNEY

United States Patent Office 3,192,120
Patented June 29, 1965

3,192,120
NUCLEAR REACTOR CORE CONSTRUCTION
John W. Campbell, London, England, assignor to Babcock
& Wilcox Limited, London, England, a corporation of
Great Britain
Filed Mar. 29, 1961, Ser. No. 99,205
1 Claim. (Cl. 176—50)

This invention relates to nuclear reactors of heterogeneous liquid-moderated type. In such reactors it is important for reasons of cheapness and simplicity to limit as far as possible the number of control rods necessary for effective control and their requisite control rod drive mechanisms and pressure vessel penetrations. It is also desirable to provide core supports which are strong and light while enabling passages of adequate size for the moderator or coolant which flows through the fuel element chambers to be provided in the core supports. Core supports of robust construction are particularly necessary in nuclear reactors for mobile use, such as on board ship.

The present invention includes a nuclear reactor of the heterogeneous, liquid-moderated type, wherein the core includes rows of fuel element chambers or of sets of fuel element chambers arranged for the flow therethrough of the moderator alternating with rows of control rods each formed with four longitudinal ribs extending between fuel element chambers or sets of fuel element chambers and so arranged that the ribs of control rods are exclusive to respective spaces between adjacent fuel element chambers or sets of fuel element chambers and project sufficiently for the edges of neighboring ribs of different control rods to lie adjacent one another.

The invention also includes a nuclear reactor of the heterogeneous, liquid-moderated type, wherein the core includes rows of fuel element chambers or of sets of fuel element chambers arranged for the flow therethrough of the moderator alternating with rows of control rods each formed with four longitudinal ribs extending between fuel element chambers or sets of fuel element chambers and so arranged that the ribs of control rods are exclusive to respective spaces between adjacent fuel element chambers or sets of fuel element chambers and project sufficiently for the edges of neighboring ribs of different control rods to lie adjacent one another and a core support includes sets of parallel grid members extending transversely of the control rods and at angles to the control rod ribs to define compartments the diagonals of which are parallel or substantially parallel to the said ribs.

The various features of novelty which characterize the invention are pointed out with particularity in the claim annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 1:
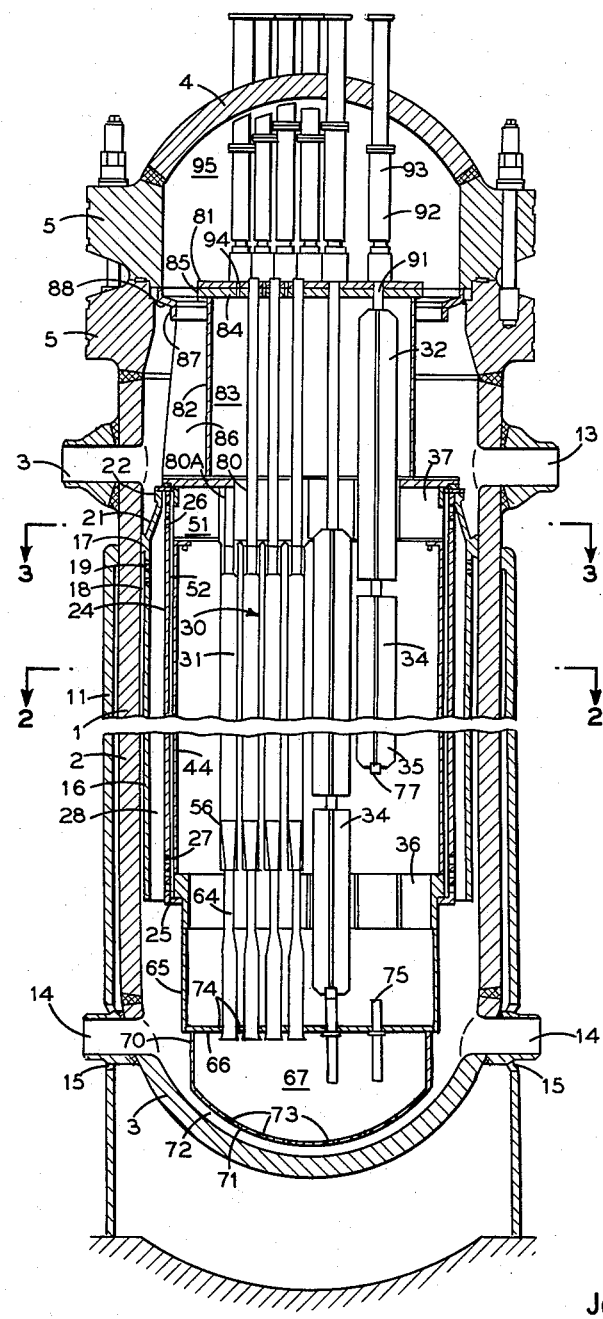
FIG. 1 is a sectional elevation of a pressurized water moderated nuclear reactor taken on the line I—I of FIG. 2 and viewed in the direction of the arrows.

The reactor of FIGURE 1 comprises a pressure vessel 1 formed as an upright circular cylindrical wall 2 having a lower dished closure 3 welded in position and an upper dished closure 4 attached by a bolted flange connection 5. The vessel 1 is supported axially within a cylindrical supporting skirt 11 which is attached at its upper end to the wall 2 of the pressure vessel at a location below the connection 5. Below the connection 5 and above the skirt 11, the pressure vessel is provided with four evenly distributed coolant outlets 13, and adjacent its lower end the vessel 1 is provided with four evenly distributed coolant inlets 14 extending through suitable apertures 15 in the skirt 11.

An outer thermal shield 16 of cylindrical form is disposed coaxially within the wall 2 of the vessel 1 and is pendant from a support ring 17 fastened to the pressure vessel wall 2 below the outlets 13, the shield 16 being spaced inwardly from the wall 2 to provide therebetween an annular flow passage 18 open at its lower end. Immediately below the ring 17, the shield 16 is formed with a circular series of apertures 19 for the flow of coolant from the passage 18.

The support ring 17 serves to support the core 30 of the reactor and to this end is formed with an upwardly tapering frusto-conical part 21 which is formed at its upper end with a bearing ring 22. The ring 22 provides a seating for an outwardly extending radial flange formed at the upper end of an intermediate thermal shield 24 which comprises a cylinder extending downwardly from the ring 22 and terminating at its lower end adjacent the lower end of the shield 16 with a radially inwardly extending annular flange 25. The shield 24 is spaced inwardly from the shield 16 to provide therebetween an annular coolant flow passage 28 and adjacent its upper end, below the ring 22, and adjacent its lower end, the shield 24 is formed with respective circularly distributed groups of apertures 26 and 27 for the flow of coolant.

Figure 2:
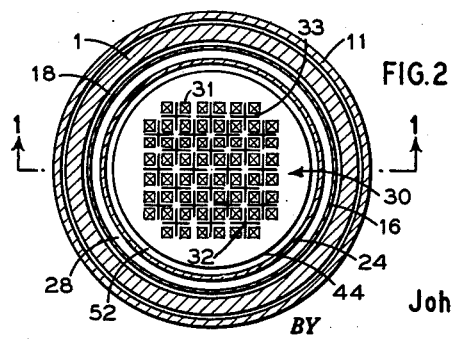
FIG. 2 is a sectional plan taken on the line II—II of FIG. 1.

The reactor core 30, comprising a group of fuel element chambers 31 and associated structure, is disposed within the shield 24 and supported on the lower flange 25 thereof. The core 30 comprises a plurality of fuel element chambers 31 each of which is substantially square in cross-section as seen in FIGURE 2, and comprises an outer casing containing a suitable arrangement of fuel elements, the chamber 31 being individually removable. The chambers 31 are disposed in mutually perpendicular rows spaced apart so that in cross-section as seen in FIGURE 2 the spaces between the chambers form a square lattice, fuel element chambers corresponding to corners of the lattice being omitted.

Vertically adjustable control rods 32 with associated lower follow up rods 34 of relatively low neutron capture cross-section material are disposed within the spaces between the chambers 31, the rods 32 and 34 being cruciform in section having four longitudinal ribs 33 arranged to extend between adjacent fuel element chambers with ribs 33 exclusive to respective spaces between adjacent chambers 31. Each rib 33 is of width substantially equal to the width of a fuel element chamber 31 so that edges of neighboring ribs of different controls rods 32 lie adjacent one another and each control rod 32 is associated with four fuel element chambers, each rod 32 bordering two sides of each of the associated chambers 31.

The core 30 is provided with a lower core support 36 and an upper core support 37 each comprising a grid like frame work of two sets of parallel grid members extending transversely of the control rods 32 at angles to the ribs 33 to define compartments of substantially square cross-section, the diagonals of which are parallel or substantially parallel to the ribs 33.

Figure 3:
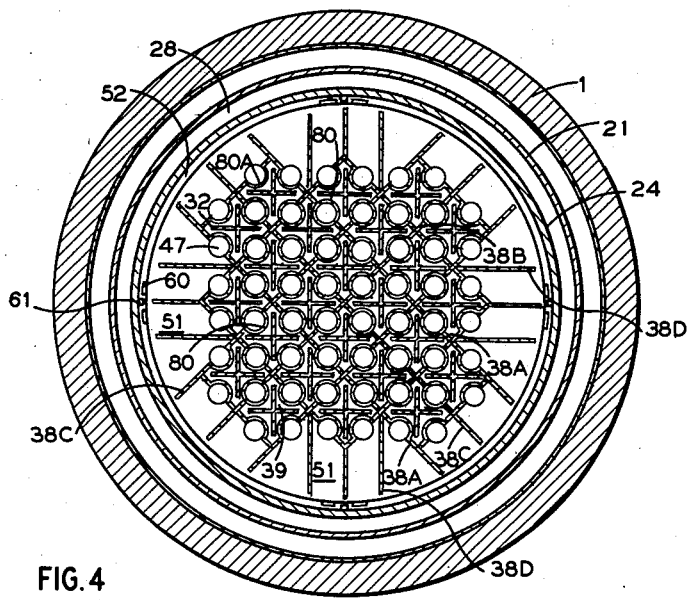
FIG. 3 is a sectional plan taken on the line III—III of FIG. 1, to an enlarged scale.
Figure 4:
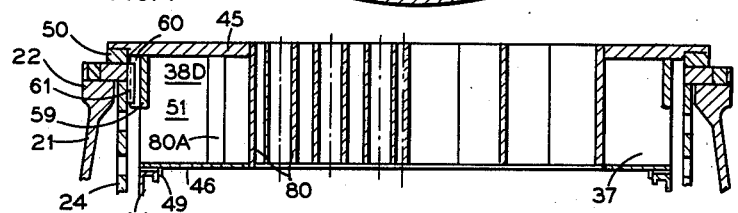
FIG. 4 is an enlarged sectional elevation of the upper core support of the reactor of FIG. 1 with extensions of tube parts omitted.
Figure 5:
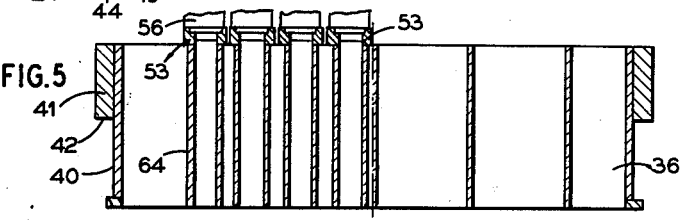
FIG. 5 is an enlarged sectional elevation of the lower core support of the reactor of FIG. 1 with extensions of tube parts omitted.

The upper and lower core supports are shown in greater detail respectively in FIGURES 4 and 5 and are similarly constructed so that the cross-section structure as seen in plan for the upper support in FIGURE 3 is substantially identical to the cross-sectional plan of the lower core support. The structure of the upper core support will be described in greater detail in connection with FIGURES 3 and 4, and of the lower core support with reference to FIGURES 3 and 5.

Referring to FIGURES 3 and 4 the upper core support 37 comprises a set of parallel grid members 38A extending horizontally and at 45° to the ribs 33 of the control rods 32, and a second set of parallel grid members 38B extending horizontally, normal to the members 38A. Each grid member 38A and 38B intersects vertical axes of an individually associated row of fuel element chambers 31, and the grid members 38A and 38B intersect to define in plan view as seen in FIGURE 3, substantially square compartments 39. Each compartment 39 provides a withdrawal passage for a control rod 32.

With the exception of the members 38A and 38B associated with the outermost rows of fuel element chambers 31, each member 38A and 38B is formed along its length with a spaced series of upright tubes 80 which extend from adjacent the bottom of the upper core support 37 upwardly beyond the upper edge of the core support as will be described hereinafter. Thus, as is seen in FIGURE 3, each grid member 38A and 38B comprises a spaced series of upright tubes 80 separated by upright web plates welded to the tubes 80 at diametrically opposite locations, adjacent web plates being united at corners of compartments 39.

The lattice defined by the grid members 38A and 38B is extended beyond the outermost rows of fuel element chambers 31 by plate extensions 38C which are parallel to member 38A or 38B and other plate extensions 38D arranged at 45° to the members 38A and 38B. The extensions 38C and 38D extend to the periphery of the support 37 and terminate with their outer ends spaced inwardly from the upper end of the shield 24.

Grid members 38A and 38B, or parts of grid members 38A and 38B, at the outermost rows of fuel element chambers 31 are not provided with tubes 80 but with half tubes 80A or channels of semicircular cross-section which are open outwardly towards the intermediate shield 24 for a purpose explained below. The half tubes 80A are upright and terminate at their upper and lower ends adjacent the top and bottom of the support 37.

The core support 37 is formed with upper and lower annular plate means 45 and 46 which provide top and bottom parts to peripheral compartments formed between grid extensions 38C and 38D. At their inner edges the plate means 45 and 46 terminate adjacent and are welded in fluid-tight manner to the members and parts of members 38A and 38B associated with the half tubes 80A and the outermost rows of fuel element chambers 31, the plate means bridging the part of the lattice defined by members 38C and 38D. The lower plate means 46 is bored at suitable locations to provide apertures 47 in which upper ends of radially outermost fuel element chambers 31 are seated, and terminates at its radially outer periphery, spaced inwardly from the intermediate thermal shield 24 at a location above the upper end of an inner thermal shield 44. On its lower face the plate 46 is formed with an annular downwardly projecting shoulder 49 arranged slidably to engage an upper part of the inner thermal shelf 44.

The upper plate means 45 extends at its outer periphery radially beyond the plate means 46 and is formed with a downwardly projecting annular shoulder 50 arranged to seat on the upper end of the intermediate shield 24. A cylindrical skirt 59 of diameter substantially equal to the outer diameter of the plate means 46. extends downwardly from the lower face of the upper plate means 45 and terminates at its lower end substantially midway between the upper and lower plate means. The skirt 59 is provided at right angle spaced locations with radially outwardly projecting pairs of lugs 60 providing sliding guide passages adapted slidably to engage upright guide lugs 61 inwardly projecting from the upper end of the intermediate thermal shield 24. The lugs 60 and 61 serve to facilitate location of the core in correct position.

The arrangement of extensions 38C and 38D is such that compartments 51 formed between adjacent extensions 38C and/or 38D are respectively associated with individual half tubes 80A and, as will be described, provide respective coolant inlet compartments to fuel element chambers 31 of outermost rows of fuel element chambers. Each of the compartments 51 is open at its radially outer side between the lower edge of the skirt 59 and the plate means 46 to a coolant flow passage 52 between the intermediate thermal shield 24 and the inner thermal shield 44.

The lower core support 36 is similarly formed in sectional plan view to the upper core support 37 as shown in FIGURE 3 with the exception that the tubes 80 and half tubes 80A are replaced by tubes 64, the arrangement of the lattice defined by the members 38A and 38B and extensions 38C and 38D and the compartments 39 and 51 being the same. As seen in FIGURE 5, the lower core support is not provided with upper and lower plate means but is formed with a cylindrical stepped wall comprising an outer peripheral wall 40 of cylindrical form provided with an outer, annular shoulder 41 adjacent its upper end and presenting a lower step 42. As may be seen in FIGURE 1, the step 42 is arranged to seat on the lower flange 25 of the intermediate thermal shield, and the lower core support 36 is supported thereby. The lower end of the cylindrical inner thermal shield 44 is secured to the lower core support 36 at the upper edge of the shoulder 40, and extends upwardly therefrom and at its upper end slidably engages the shoulder 49 formed on the lower face of the plate means 46 of the upper core support, as has been described, to permit relative vertical movement due to differential thermal expansion.

The tubes 64 terminate at their upper ends adjacent the top of the lower core support 36 and are formed with respective upper annular pads 53 providing seatings for lower ends of respective fuel element chambers 31. The pads 53 are square in cross-section and are formed with circular bores for flow communication between tubes 64 and corresponding fuel element chambers 31. Fuel element chamber containers 56 of square cross section are secured at their lower ends to respective pads 53, the containers 56 being adapted slidably to receive respective fuel element chambers and terminating at their upper ends spaced below the bottom of the upper core support to permit relative vertical movement due to differential expansion. The lower ends of fuel element chambers 31 are adapted to socket into apertures of respective pads 53 and at their upper ends are formed with spring loaded bayonet fittings for resiliently socketing into respective tubes 80 or apertures 47 at the upper core support 37.

The upright tubes 64 extend downwardly from the lower core support 36 and are increased in diameter to provide downwardly flaring bores below the support 36 and are secured at their lower ends in respective apertures formed in a lower baffle plate 66. A cylindrical wall member 65 is secured at its upper edge to a lower edge of the peripheral wall 40 of the core support 36 and extends downwardly therefrom circumscribing lower parts of the tubes 64. At its lower edge the wall 65 is secured to the peripheral edge of the baffle plate 66 which is of circular form.

A chamber 67 formed below the baffle plate 66, is defined by a cylindrical wall 70 secured at its upper edge to the baffle plate 66 and at its lower edge secured to a lower dished end wall 71, the walls 70 and 71 being spaced inwardly from the pressure vessel closure 3 to provide a coolant flow pasasge 72 therebetween. The lower dished wall 71 is formed with a plurality of small orifices 73 arranged to permit flow of coolant from the passage 72 into the chamber 67.

The baffle plate 66 is provided, between adjacent apertures associated with the tubes 64, with small orifices 74 arranged to permit flow of coolant upwardly from the chamber 67 into the space above the plate 66 and within the wall 65 outside the tubes 64 and thence upwardly through spaces containing the control rods 32 and outside the containers 56 for the fuel element chambers 31. The orifices 74 serve to help control the flow of coolant in relation to the control rods 32.

Rigidly supported at suitable apertures in the baffle plate 66 are respective control rod stop means 75 adapted to serve as resilient shock absorbing means for engagement with respective bearing pads 77 formed at the lower ends of control rod and follow up rod assemblies and for absorbing shocks due to falling of the control rod and follow up rod assemblies. The stop means 75 are so arranged that with the associated control rods 32 in their lowermost positions, the follow up rods 34 occupy positions largely below the lower core support 36.

The tubes 80 associated with the upper core support 37 extend upwardly therefrom to an upper cover plate 81 disposed remote from the reactor core 30 at the level of the flange connection 5 of the pressure vessel 1. An upright cylindrical wall 82 defining the peripheral wall of a withdrawal chamber 83 containing upper parts of the tubes 80 and for receiving the control rods 32 when in uppermost position is secured at its lower end to the upper plate means 45 of the upper core support 37. The wall 82 is secured at its upper end to a top plate 84 which is connected to the cover plate 81 in abutting relationship with a lower surface thereof and presents a radially outwardly extending flange 85 at the upper end of the wall 82. A circularly distributed series of upright web members 86 is secured to the flange 85, the plate means 45 and the wall 82, and secured to radially outer upper parts of the web members 85 is a circumscribing bearing ring 87 disposed below the top plate 84.

A resilient shoulder member 88 is secured to a radially inner, lower portion of the pressure vessel closure 4 and comprises a downwardly and inwardly extending resilient ring arranged to engage and urge downwardly the bearing ring 87. The resilient ring 88 serves when the closure 4 is in position to hold down the upper core support 37 against the bearing ring 22 of support member 21 and to maintain the fuel element chambers 31 in their respective upper and lower seatings.

The cover plate 81 and top plate 84 are formed with suitable apertures for the passage of operating stems 91 of control rod operating means 92 which include respective casings 93 extending upwardly in fluid tight manner through apertures formed in the closure 4 of the pressure vessel. The operating stems 91 are connected at their lower ends to upper ends of respective control rods 32.

The cover plate 81 and top plate 84 are provided with suitable orifices 94 for the passage upwardly of coolant from the space within the withdrawal chamber 83 outside the tubes 80 into an upper coolant chamber 95 formed within the pressure vessel 1 above the cover plate 81. The orifices 94 help to control the flow of coolant in relation to the control rods 32.

In the arrangement described, groups of fuel element chambers 31 are disposed in respective coolant passes connected in series through means including compartments of the lower core support 36. There is, as seen in FIGURE 3, an outer group of fuel element chambers 31 connected at their upper ends in fluid flow relationship with half tubes 80A and peripheral compartments 51 of the upper core support 36. There is also an inner larger group of fuel element chambers 31 connected at their upper ends in fluid flow relationship with tubes 80. The peripheral compartments 51 serve to conduct coolant downwardly through the outer group of fuel element chambers and into the lower chamber 67, and the chamber 67 serves to conduct coolant upwardly through the inner group of fuel element chambers 31.

During operation of the reactor, water which acts both as moderator and coolant is supplied at pressure to the vessel 1 by way of the lower inlets 14 and some of the water flows upwardly through the passages 18, 28 and 52 and by way of the apertures 19 and 26 into the compartments 51 of the upper core support 37. The coolant received by compartments 51 flows downwardly through the apertures 47 in the plate means 46 through the fuel element chambers 31 and repective containers 56 associated with the half tubes 80A. Coolant from said fuel element chambers 31 and containers 56, which form the outermost group, flows downwardly through the associated tubes 64 into the lower chamber 67.

Other coolant from the inlets 14 flows downwardly through the passage 72 below the chamber 67, serving to cool the bottom of the pressure vessel 1, and thence flows upwardly through the orifices 73 into the chamber 67.

Some of the coolant received by the chamber 67 flows upwardly through the orifices 74 in the baffle plate 66 into the space outside the tubes 64 and within the wall 65, and thence through the compartments 51 and 39 of the lower core support 36 to the spaces between the fuel element containers 56 where it serves to cool the control rods 32. This coolant then flows through the compartments 39 of the upper core support 37 and into the withdrawal chamber 83 outside the tubes 80. From the withdrawal chamber 83 this coolant flows through the orifices 94 in the top plate 84 and cover plate 81 into the coolant receiving chamber 95.

The remainder of the coolant received by the chamber 67 passes upwardly through the tubes 64 associated with the inner group of fuel element chambers and extending through the lower core support, into respective fuel element chambers 31 and associated containers 56 from which it flows upwardly through respective tubes 80 into the coolant receiving chamber 95.

Coolant received by the chamber 95 passes downwardly, outside the withdrawal chamber 83 and is discharged through the outlets 13.

In the reactor described, the grid members 38A and 38B of the core supports 36 and 37 intersect at locations between adjacent edges of control rods so that the ribs 33 of the control rods 32 may be of maximum length without fouling the grid members. Furthermore the ribs substantially fill the lattice of spaces between the containers 56 so that each fuel element chamber, excepting those of the outermost rows, is substantially surrounded by ribs 33 of control rods 32 or associated follow up rods.

The construction described is particularly suitable when the nuclear reactor is intended for mobile use, as on board ship, since the core supports 36 and 37 are not only light, but very rigid and resistant to shock. At the same time a relatively large surface area of control rod is obtained while maintaining a relatively small number of control rods 32 compared with the number of fuel element chambers 31.

Figure 6:
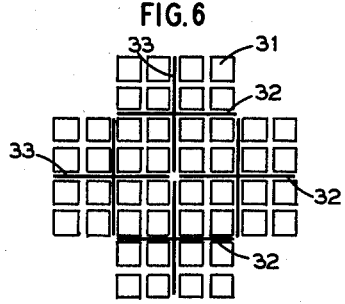
FIG. 6 is a sectional plan view of part of a modified arrangement of fuel element chambers and control rods.

It will be appreciated that the width of each control rod rib may be greater than the width of a fuel element chamber. For example the fuel element chambers may be arranged in groups of four chambers 31 set in square formation as is shown in FIGURE 6, the groups being arranged in rows alternating with rows of cruciform control rods 32, and each control rod rib 33 having a length substantially equal to twice the width of a fuel element chamber. As is seen in FIGURE 6, each group of fuel element chambers is substantially surrounded by control rod ribs 33, each rib bordering outer sides of two chambers 31.

In the arrangement of FIGURE 6 a large area of control rod surface is provided and the number of control rods relative to the number of fuel element chambers is reduced.

While in accordance with the provisions of the statutes there is illustrated and described herein a specific embodiment of the invention, those skilled in the art will understand that changes may be made in the form of the invention covered by the claim, and that certain features of the invention may sometimes be used to advantage without a corresponding use of the other features.

What is claimed is:

A nuclear reactor of the heterogeneous liquid-moderated type comprising a number of rows of vertically extending spaced fuel element chambers forming a core, a number of rows of vertically extending control rods of cruciform shape positioned between said fuel chambers, each of said rods having a plurality of longitudinal ribs extending radially outward from a common center into the spaces between said fuel element chambers, a horizontally extending upper support disposed above said core and a horizontally extending lower support disposed below said core to support and space said fuel element chambers, said upper and lower supports each comprising two sets of parallel grid members extending transversely of said control rods, the grid members of each of said sets arranged in the same equally spaced relationship to one another and extending perpendicular to and interconnected with the grid members of the other said set, the grid members of each of said sets disposed at substantially a 45 degree angle with the ribs of said control rods, the grid members of each of said sets dividing said upper and lower supports into a number of compartments each having the same substantially uniform cross-sectional area and shape and the diagonals of which are substantilly parallel to the ribs of said control rods, and vertically extending tubes connected to and in axial alignment with the vertical axes of said grid members, said tubes being substantially co-axial with said fuel element chambers for conducting coolant into and out of said fuel element chambers.

References Cited by the Examiner

UNITED STATES PATENTS

| | | | |
|---|---|---|---|
| 2,920,025 | 1/60 | Anderson | 176—65 |
| 2,982,713 | 5/61 | Sankovich et al. | 176—78 |
| 2,999,059 | 9/61 | Treshow | 176—42 |

FOREIGN PATENTS 1,168,933  9/58  France.

CARL D. QUARFORTH, *Primary Examiner.*

REUBEN EPSTEIN, *Examiner.*